(12) United States Patent
Bosbach et al.

(10) Patent No.: US 11,475,129 B2
(45) Date of Patent: *Oct. 18, 2022

(54) METHOD FOR THE PROTECTION AGAINST CAVITATION IN CYBER ATTACKS AND UNIT FOR CARRYING OUT THE METHOD

(71) Applicant: KSB SE & Co. KGaA, Frankenthal (DE)

(72) Inventors: Franz Gerhard Bosbach, Frankenthal (DE); Soenke Brodersen, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 332 days.

This patent is subject to a terminal disclaimer.

(21) Appl. No.: 16/639,176

(22) PCT Filed: Aug. 1, 2018

(86) PCT No.: PCT/EP2018/070846
§ 371 (c)(1),
(2) Date: Feb. 14, 2020

(87) PCT Pub. No.: WO2019/034426
PCT Pub. Date: Feb. 21, 2019

(65) Prior Publication Data
US 2020/0233957 A1 Jul. 23, 2020

(30) Foreign Application Priority Data

Aug. 15, 2017 (DE) .................... 10 2017 214 203.0

(51) Int. Cl.
*G06F 21/00* (2013.01)
*G06F 21/55* (2013.01)
*G06F 8/61* (2018.01)

(52) U.S. Cl.
CPC .............. *G06F 21/554* (2013.01); *G06F 8/61* (2013.01); *G06F 2221/033* (2013.01)

(58) Field of Classification Search
CPC ..... G06F 21/554; G06F 8/61; G06F 2221/033
See application file for complete search history.

(56) References Cited

U.S. PATENT DOCUMENTS 5,884,026 A * 3/1999 Kong .................... G06F 21/575
713/192
6,655,922 B1  12/2003 Flek
(Continued)

FOREIGN PATENT DOCUMENTS

CN    102299909 A    12/2011
CN    103486088 A    1/2014
(Continued)

OTHER PUBLICATIONS

International Preliminary Report on Patentability (PCT/IB/338 & PCT/IB/373) issued in PCT Application No. PCT/EP2018/070846 dated Feb. 27, 2020, including English translation of document C1 (German-language Written Opinion (PCT/ISA/237) previously filed on Feb. 14, 2020) (seven pages).
(Continued)

*Primary Examiner* — Ghazal B Shehni
(74) *Attorney, Agent, or Firm* — Crowell & Moring LLP

(57) ABSTRACT

A method and device for protecting a flow-conducting device of an installation against cavitation initiated by cyber attacks. At least one signal relating to an operating state of the installation is evaluated by an evaluation unit in order to detect a cyber attack by comparison with at least one reference value. If the evaluation unit detects a willfully brought-about irregular operating mode of the installation based on the evaluation, the unit passes on signals to components of the installation to bring about an installation operating mode which is in compliance with regulations and
(Continued)

during which generation of cavitation is avoided, and produces a state in which the flow-conducting device is protected against the current cyber attack and/or against future cyber attacks.

12 Claims, 2 Drawing Sheets

(56) References Cited

U.S. PATENT DOCUMENTS

| | | | |
|---|---|---|---|
| 9,073,394 B1* | 7/2015 | Clasquin | B60C 25/056 |
| 2011/0072506 A1 | 3/2011 | Law et al. | |
| 2012/0111114 A1 | 5/2012 | Emde et al. | |
| 2014/0283047 A1 | 9/2014 | Dixit et al. | |
| 2016/0330225 A1* | 11/2016 | Kroyzer | H04L 63/1425 |
| 2018/0157831 A1* | 6/2018 | Abbaszadeh | G06F 21/552 |

FOREIGN PATENT DOCUMENTS

| | | |
|---|---|---|
| CN | 104052730 A | 9/2014 |
| CN | 205263625 U | 5/2016 |
| CN | 106194777 A | 12/2016 |
| CN | 106462137 A | 2/2017 |
| DE | 198 48 726 A1 | 4/2000 |
| DE | 602 03 458 T2 | 9/2005 |
| DE | 602 06 711 T2 | 5/2006 |
| DE | 10 2010 027 999 A1 | 10/2011 |
| EP | 2 500 579 A1 | 9/2012 |
| EP | 2 279 465 B1 | 4/2014 |
| EP | 2 433 010 B1 | 9/2015 |

OTHER PUBLICATIONS

German-language Written Opinion (PCT/ISA/237) issued in PCT Application No. PCT/EP2018/070846 dated Feb. 21, 2018 (six (6) pages).

German-language Office Action issued in counterpart German Application No. 10 2017 214 203.0 dated May 16, 2018 (six (6) pages).

Chinese-language Office Action issued in Chinese Application No. 201880053003.8 dated May 27, 2021 with English translation (11 pages).

* cited by examiner

METHOD FOR THE PROTECTION AGAINST CAVITATION IN CYBER ATTACKS AND UNIT FOR CARRYING OUT THE METHOD

CROSS REFERENCE TO RELATED APPLICATIONS

This application is a continuation of PCT International Application No. PCT/EP2018/070846, filed Aug. 1, 2018, which claims priority under 35 U.S.C. § 119 from German Patent Application No. 10 2017 214 203.0, filed Aug. 15, 2017, the entire disclosures of which are herein expressly incorporated by reference.

BACKGROUND AND SUMMARY OF THE INVENTION

The present invention relates to a method and to a unit for protecting a flow-conducting device against cavitation damage in an installation, said damage being caused by cyber attacks.

Flow-conducting devices play a significant role in production installations. Such flow-conducting devices are, for example, pumps or fittings. The fittings are differentiated between actuating fittings for regulating a flow, such as for example regulating fittings, and switching fittings which are preferably operated in an on/off position, in order to completely release a flow or to completely shut off a flow, such as for example sliders, valves or faucets.

The method according to the invention also serves, in particular, to protect centrifugal pumps. Centrifugal pumps are based on a functional principle of transmission of energy to a fluid by changing swirling owing to a torque which is applied by a rotating impeller wheel to the fluid flowing through the latter. A centrifugal pump is a continuous-flow machine. It utilizes the centrifugal force to deliver fluid. For this reason it is also referred to as a centrifugal pump. The medium to be delivered enters the centrifugal pump via a suction pipe, is taken up by a rotating impeller wheel and is carried outward on a spiral path. The radial speed of the fluid which is applied as a result and which decreases outward gives rise to an outwardly increasing pressure within the pump, which pressure is conveyed into a pressure pipe by the fluid.

In the case of flow-conducting devices such as, for example, centrifugal pumps or fittings, a phenomenon can occur which is referred to as cavitation. Cavitation is understood to mean the forming and dissolving of vapor-filled cavities (vapor bubbles) in a medium. When cavitation occurs two borderline cases are differentiated, between which cases there are many transitional forms. In the case of vapor cavitation (also referred to as hard cavitation), the cavities mainly contain vapor of the surrounding fluid. Such cavities collapse under the effect of the external pressure by bubble implosion. As a result, microscopic vapor shocks occur. In the case of soft gas cavitation, gases which are dissolved in the fluid enter the cavities (outgassing) so that the collapse is less pronounced.

If the static pressure in a fluid drops below the vapor pressure of the fluid, vapor bubbles are formed. These are subsequently carried along with the flowing fluid into regions of relatively high pressure. When the static pressure rises again above the vapor pressure, the vapor suddenly condenses in the cavities and the vapor bubbles collapse. Extreme pressure peaks and, under certain circumstances, temperature peaks occur in the process.

If cavitation occurs at the surface of solid bodies, what is referred to as cavitation erosion occurs under certain circumstances. The surface material is damaged by the high mechanical stresses. When the vapor bubbles implode, what is referred to as a microjet frequently occurs, and this damages the components.

The targeted initiation of cavitation phenomena is also a means used in cyber attacks. Cyber attacks are targeted attacks on specific infrastructure of important computer networks from the outside. Such computer networks are also increasingly used to control installations. In order to measure and perform open-loop and closed-loop control of sequences, for example in order to automate processes and in order to monitor large systems, what are referred to as industrial control systems (ICS) are being used in many branches of industry. These are frequently used in productive industries.

In the past, ICS were physically isolated from other IT systems and networks and therefore protected against external influences. Therefore, IT security was of secondary importance.

With the introduction of IT systems found in offices and the increasing networking of the ICS these systems are now subject to similar risks to systems found in a classic company IT system.

The attackers' approach will differ depending on their target. In systems which can be accessed directly via the Internet, attacks on the system are started in a targeted fashion. Therefore, weak points of the system under attack are exploited directly. These weak points may relate, under certain circumstances, to the operating system or to server applications.

In many attacks which have become publicly known in the last few years, spear phishing attacks have been used as an entry into the company. In this way, a type of "bridgehead" is directed at a computer in the company. From this bridgehead the network is explored and further systems are identified. If the attackers have reached the actual target system, they extract the desired information from there and carry out manipulation. If the attacker has reached its target, it attempts to erase its tracks and remain undetected.

Further attacks are aimed at closed systems by propagation via mobile data memories which are carelessly connected to a closed system. The routine installs itself by reading out the mobile data memory.

If hackers attack industrial installations by means of cyber attacks it is therefore frequently the case that power supplies are interrupted in a targeted fashion. For general attacks which act in a more differentiated fashion than general deactivation a complex procedure is necessary. If specific processes are aimed at, precise knowledge about the structure and regulation is therefore necessary. Causing damage here requires a very specific procedure. However, all processes with fluids have flow-conducting devices of more or less standardized designs, and these can be widely identified and can be attacked in a more structured fashion than entire processes. The targeted initiation of destructive cavitation phenomena in flow-conducting devices in installations is also a realistic scenario.

For example, the position of a valve which regulates a flow of fluid to a pump can be manipulated by a cyber attack. As a result of this manipulation, the static pressure can drop below the vapor pressure so that vapor bubbles form in the fluid. If these vapor bubbles collapse shortly after this in the vicinity of the pump, small microscopic damage occurs to the pump components, such as for example to the impeller wheel of the pump. As a result, over time the installation is damaged, and in the worst case an unplanned outage can occur. Fittings themselves can also be damaged by cavitation. For example, the flow in the worn state is therefore changed or the seal is no longer provided.

Some pumps are customized designs so that after damage several weeks or months may pass until a replacement pump is ready. In the worst case, the installation is idle until then. Therefore, such attacks on flow-conducting devices can give rise to high production downtimes.

In the worst case, such instances of manipulation at multiple points of a production process can even result in explosions. In the case of a chemical installation the consequences would be fatal. In the case of oil or gas extraction installations there can be wide ranging consequences for the environment.

EP 2 279 465 B1 describes a computer implemented method for cyber security management for an industrial control system. In this case, a centralized system-security-manager program module is made available. This module can be introduced by means of a processing device. The centralized system-security-management program module is integrated into an integrated command and control user interface in a monitoring, control and data collection unit.

EP 2 500 579 A1 describes a method for monitoring a centrifugal pump which is driven by an electric motor. The method which is described in this document is based on the realization that the gas bubbles which implode when cavitation occurs and the gas bubbles impact torques, compressed when gas is carried along, on the blades of the impeller wheel cause vibrations which can be detected in the drive as torque impulses. Since the power consumption and the load current of the electric motor are decisive for the formation of torque, their values can be advantageously determined in order to detect such impulses and evaluate them. Since values of the power consumption or of the load current are usually present in any case in motor control systems, no additional sensor system is necessary for monitoring the centrifugal pump.

EP 2 433 010 B1 describes a method and a device for determining the operating point of a working machine. A power level which is taken up by the working machine, or the delivery quantity thereof characterize an operating point here. In the method, operating-point-dependent measurement variables of the working machine are registered by means of sensors. The measured values are stored and evaluated during operation.

The object of the invention is to make available a method and a device by means of which cyber attacks on flow-conducting devices, such as for example pumps or fittings, can be effectively prevented. In this context, the intention is to reliably protect the components which are used in the installation so that a downtime of the installation is prevented. The method and the device are also intended to be easy to implement in the installation so that a device and/or retrofitting are associated with a lowest possible cost for the manufacturer and the operator.

According to the invention, firstly at least one first signal is registered in the installation in which the flow-conducting device is located, wherein the first signal relates to an operating state of the installation. The registering process is carried out using at least one sensor. The first signal is passed onto a unit or registered by a unit and evaluated there. In the unit, setpoint variables and actual variables are compared with one another and the at least one first signal is compared with at least one reference value. If the unit detects on the basis of the evaluation that a willfully brought-about operating mode of the installation is occurring, i.e. whether a cyber attack in order to bring about cavitation has taken place or is taking place, the unit reacts by emitting a second signal.

In reaction to the second signal, the installation is returned to a state which is in compliance with the regulations and in which the flow-conducting device is protected against cavitation damage and there is effective defense against the cyber attack, by correspondingly actuating one or more components of the installation. On the other hand, in reaction to the second signal the installation or the flow-conducting device is placed in a state in which it is protected against the current cyber attack and/or against further cyber attacks, i.e. willful placing of the installation in an irregular operating mode is ruled out in this protected state. The flow-conducting device or the entire installation and/or the unit can then also be disconnected, for example, from the network via which the cyber attack has taken place, so that no further cyber attack is possible any more.

The method according to the invention is suitable here both for defending against cyber attacks on a central network which is connected to the installation and for defending against cyber attacks on individual components of the installation. A willfully brought-about irregular operating mode of the installation is then detected by the unit during the evaluation if the profile or specific features (such as for example the amplitude, frequency content, etc.) of the at least one first signal differs considerably in comparison with the at least one reference value, i.e. if predefined limiting values are exceeded or undershot or if the time profile of the at least first signal has specific properties or patterns. Satisfaction of these criteria, which depend on the respective installation, the components thereof, the medium used etc., indicates that a normal operating mode of the installation is not occurring and that a number anomalies of the first signal have not been triggered randomly or by a technical fault but rather that a targeted intervention into the operating mode of the installation is taking place or has taken place, with the objective of bringing about damaging cavitation the flow-conducting device.

According to the invention, one or more operating states of the flow-conducting device or of the installation are registered by the at least one sensor. The operating states may be for example, (thermal) radiation, vibrations, acoustic emissions, leakages, pressures, flow rates or temperatures. These operating states are analyzed by the unit and evaluated for the presence of signatures which indicate a cyber attack.

Up to the counter measures following detection of a cyber attack, an iterative method can be applied in which individual steps or step sequences or the entire method are/is repeated once or multiple times.

The analysis or evaluation of the first signal by the unit can permit particular attention to be paid to minor continuously acting, briefly intensive, pulsating anomalies or anomalies which occur in a structured fashion and which do not come about during normal operation (regular operation). In order to identify incipient cyber attacks, an unfalsified load complex can be characterized by an operating-point-dependent standard signal behavior, identified and stored as a reference.

The term cyber attack denotes here a willful imposition being carried out of an irregular operating mode from the outside.

In one variant of the invention, the unit is a decentralized open-loop and/or closed-loop control device. The unit can be mounted directly on or in the respective flow-conducting device, that is to say for example directly on the fitting to be protected or the pump to be protected. By means of this decentralized unit it is also then possible to protect against cyber attacks even if the entire process control system is already infected by the cyber attack or hacker attack. The independent decentralized unit can register unfavorable operating states which cause instances of cavitation to occur and therefore detect a hacker attack. Furthermore, this decentralized unit can advantageously disconnect the respective flow-conducting device from the network/computer network or the process control system until the hacker attack is warded off.

It can be a monitoring unit as the unit which is completely independent of process control systems or of a network. In one variant, the unit is mounted directly on the flow-conducting device and is only connected to sensors or to components of the drive assembly of the flow-conducting device. When signals which are registered by the unit which is completely disconnected from a process control system or network are analyzed, the unit can detect unfavorable operating states which can bring about instances of cavitation and indicate a cyber attack, and can independently initiate corresponding counter measures.

However, it may also be the case that the flow-conducting device is not connected to a computer unit but other parts of the installation are. A cyber attack can then have the target of bringing about, through targeted manipulation of certain components of the installation, for example of a valve in the feed line of the flow-conducting device, cavitation in the installation which nevertheless damages the flow-conducting device which is not connected at all to the actual computer network. In this case, the unit which is itself connected to the computer unit can disconnect the respective components of the installation or the entire installation and, if appropriate, itself autonomously from the compromised computer network, and actuate the various components of the installation in such a way that it is returned to an operating mode which is in compliance with the regulations and in which no cavitation occurs.

In one particularly preferred variant of the invention, the unit is configured here in such a way that it is dominant in the command structure with the process control system or the network with which the entire system is interconnected. If the unit detects a cyber attack, it disconnects the flow-conducting device or the installation and/or itself completely from the process control system or the network and therefore protects said device or installation or itself against further attacks.

Additionally or alternatively, optical and/or acoustic alarm signals can be output so that the operator is alerted to the detected cyber attack.

In one variant of the invention, the unit has a data memory. The data memory serves to register and store technological data of the of the installation, in particular of the flow-conducting device and/or of a drive which is connected to the flow-conducting device. In addition, vapor pressure states of the medium which flows through the flow-conducting device can be stored in the data memory.

The unit preferably has at least one connection for a sensor. In particular optical sensors, acoustic sensors (e.g. ultrasonic sensors), pressure sensors, flow sensors or temperature sensors are suitable here for detecting cyber attacks which are intended to bring about cavitation.

Pressure sensors for registering static pressures are also able to register dynamic pressure fluctuations. Such pressure sensors are mounted on a standard basis on a large number of pumps, in particular in order to register their final pressure. The at least one first signal can therefore also relate to pressure fluctuations within the installation, in particular in an inflow line and/or outflow line of the flow-conducting device.

In one of the more particularly advantageous variants of the invention, the unit has a monitoring module. The monitoring module can have an evaluation unit. The evaluation unit for its part can be connected to a data memory. Furthermore, the monitoring module can comprise an input unit and/or an output unit.

In one advantageous variant of the invention, the monitoring module is connected to a motor module. The monitoring module and the motor module can be completely detached from a process control system or a network in a decentralized fashion, or can also be an alternative variant part of a process control system.

A motor control unit is preferably connected to a motor module, the evaluation unit of the monitoring module and to an electric motor. The electric motor can serve here as a drive for the flow-conducting device.

In order to avoid cavitation and protection against a cyber attack, the unit can change, for example, the throughflow in a feed line to the flow-conducting device after the detection of a cyber attack, so that cavitation phenomena are effectively avoided. By varying, for example, a valve position it is possible to avoid the static pressure dropping below the vapor pressure and vapor bubbles forming which can subsequently implode and cause corresponding damage through the generation of a microjet.

Cavitation which occurs when there is a slightly falling intake pressure of a flow-conducting device which is embodied as a pump can be prevented, while maintaining the functionality, with a relatively low rotational speed of a drive which drives the pump.

For example the pressure and/or the flow rate and/or the temperature of the medium flowing through the flow-conducting device can be registered upstream and/or downstream of the flow-conducting device as a first signal relating to an operating state of the installation.

In one particularly favorable embodiment of the invention, the inflow pressure to the flow-conducting device is registered here.

Additionally or alternatively, pressure fluctuations can also be registered by means of sensors which are mounted upstream of, downstream of and/or in the flow-conducting device. By analyzing the pressure fluctuations it is also possible to detect an occurrence of cavitation as a result of a possible cyber attack.

Additionally or alternatively in order to prevent the occurrence of cavitation, the through-flow can also be changed on the pressure side of the flow-conducting device. This can also be brought about by changing a valve position by corresponding actuation by the unit.

Further features and advantages of the invention emerge from the description of example embodiments on the basis of drawings and from the drawings themselves. In this context:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
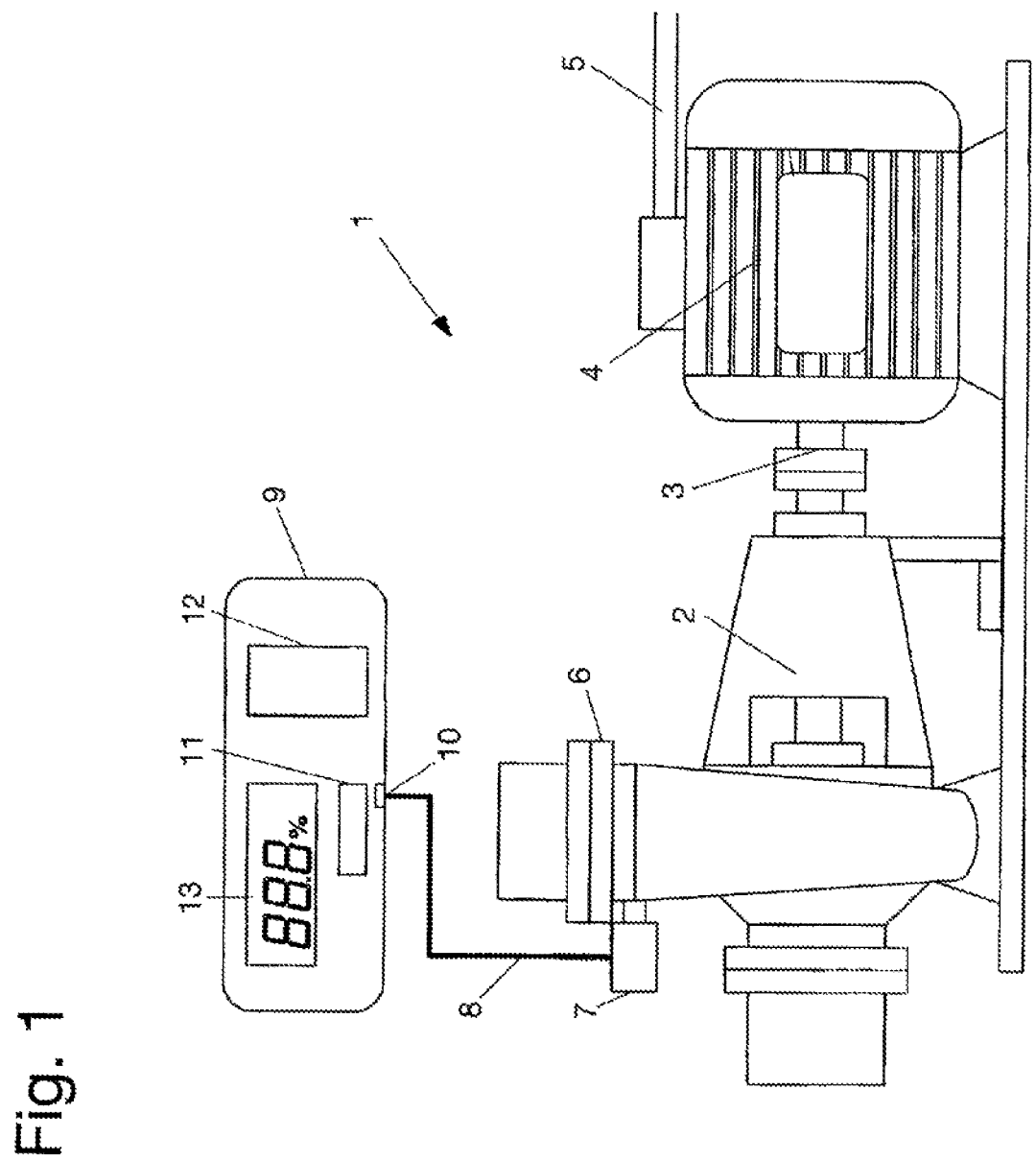
FIG. 1: shows an arrangement in accordance with an embodiment of the present invention with a flow-conducting device which is embodied as a centrifugal pump.

FIG. 1 shows an arrangement 1 in which a flow-conducting device 2 which is embodied as a centrifugal pump is illustrated. The flow-conducting device 2 which is embodied as a centrifugal pump is connected to a drive 4 via a shaft 3. The drive 4 is embodied in the example embodiment as an asynchronous motor which drives the flow-conducting device 2. The asynchronous motor 4 is fed by a mains supply line 5. A sensor 7 for measuring the pressure-side pressure or final pressure of the centrifugal pump is arranged on a pressure connector 6 of the flow-conducting device 2. The sensor 7 is connected to a unit 9 via a line 8.

The unit 9 evaluates measurement signals of the sensor 7 and can as a result analyze critical operating states which bring about cavitation and permit a cyber attack to be inferred. The unit 9 utilizes the method according to the invention for this purpose.

Additionally or alternatively, characteristic variables of the drive 4, such as for example for the rate of power and/or the rotational speed, can also be used to carry out the method according to the invention. Other parameters can also be derived or calculated from these parameters. The unit 9 has connections 10 which are suitable for registering the signal or the signals of the sensor 7. The connections 10 are embodied as signal inputs in the example embodiment.

In the example embodiment, unit 9 has a signal processing module 11. The signal processing module 11 can also be able, for example, to determine a rotational sound frequency with a relatively high accuracy.

The method which occurs in the unit 9 is controlled and coordinated by the computing module 12. Furthermore, the unit 9 has a display and operating control element 13. A further pressure sensor connection (not illustrated here), which serves, for example, to register the pump suction pressure, can be provided on the arrangement. Furthermore, the arrangement can have further signal inputs (not illustrated here) and/or a serial bus interface or for reading parameters in and out.

Figure 2:
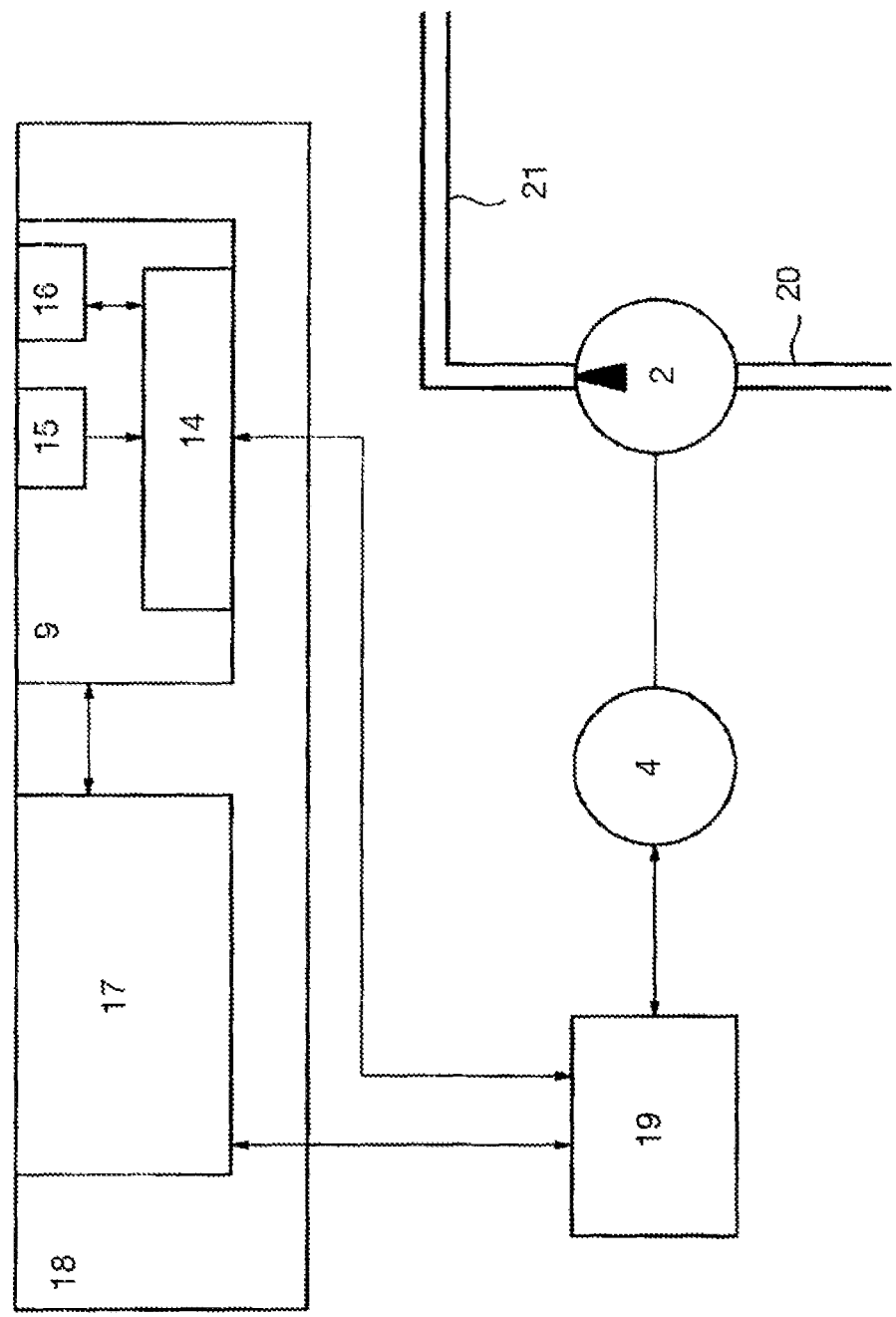
FIG. 2: shows a block diagram of a unit of the flow-conducting device of FIG. 1.

FIG. 2 shows a block circuit diagram and shows a unit 9 for performing open-loop and/or closed-loop control of a flow-conducting device 2. The unit 9 has in the illustration according to FIG. 2 an evaluation module 14, a memory 15 which is connected to the evaluation module 14, and an input/output unit 16 which is also connected to the evaluation module 14. The unit 9 is connected to the motor module 17. The unit 9 and the motor module 17 can be part of a process control system 18, but do not have to be. A motor control unit 19 is connected to the motor module 17, to the unit 9 and to the drive 4. If appropriate, the motor control unit 19 is connected directly to the flow-conducting device 2.

The drive 4 drives the flow-conducting device 2 which is embodied as a centrifugal pump. The flow-conducting device 2 is supplied with fluid delivery medium via a feed line 20 and pumps the delivery medium out via a discharge line 21. The data traffic between the specified components is indicated by arrows.

LIST OF REFERENCE NUMBERS

1 Arrangement
2 Flow-conducting device
3 Shaft
4 Drive
5 Main supply line
6 Pressure connector
7 Sensor
8 Line
9 Unit
10 Connection
11 Signal processing module
12 Computing module
13 Operator control element
14 Evaluation module
15 Memory
16 Input/output unit
17 Motor module
18 Process control system
19 Motor control unit
20 Feed line
21 Discharge line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for protecting a flow-conducting device of an installation against cavitation initiated by a cyber attack, comprising the steps of:
   acquiring using at least one sensor at least one first signal relating to an operating state of the installation;
   evaluating the at least one first signal using an evaluation unit, wherein the evaluation comprises a comparison of the at least one first signal with at least one reference value;
   outputting of a second signal by the evaluation unit if the evaluation unit detects, on the basis of the evaluation of the at least one first signal, an irregular operating mode of the installation,
   setting in reaction to the second signal operating states of components of the installation in order to bring about an operating mode of the installation in which a generation of cavitation is avoided; and
   setting in reaction to the second signal an operating state of the flow-conducting device in which the flow-conducting device is protected against at least one of the current irregular operating mode of the installation and a further attempt to set a further irregular operating mode of the installation,
   wherein the flow-conducting device is a centrifugal pump which is driven by a drive.

2. The method as claimed in claim 1, wherein
   the evaluation unit has a data memory with technological data of the installation, including technological data of one or both of the flow-conducting device and of a drive which is connected to the flow-conducting device.

3. The method as claimed in claim 2, wherein
   the stored technological data comprise thermodynamic substance data, including vapor pressure states of a medium flowing through the flow-conducting device.

4. The method as claimed in claim 3, wherein
   the at least one first signal relating to the operating state of the installation includes one of more of a pressure, and a flow rate and a temperature of the medium flowing through the flow-conducting device obtained one or both of upstream and downstream of the flow-conducting device.

5. The method as claimed in claim 1, wherein
the setting of operating states of the components of the installation comprises changing the flow of the medium through the flow-conducting device by actuating a valve one or both of in a feed line to the flow-conducting device and on a pressure side of the flow-conducting device.

6. The method as claimed in claim 1, wherein
one of both of the flow-conducting device (and the evaluation unit are connected to a computer network configured to perform one of both of closed-loop and open-loop control of the installation.

7. The method as claimed in claim 6, wherein
the step of setting in reaction to the second signal the operating state of the flow-conducting device in which the flow-conducting device is protected against at least one of the current irregular operating mode of the installation and the further attempt to set a further irregular operating mode of the installation includes disconnecting at least one of the flow-conducting device, the components of the installation and the evaluation unit from the computer network.

8. The method as claimed in claim 7, wherein
the evaluation unit is configured to carry out independently, in a state in which it is disconnected from the computer network, the evaluating step.

9. The method as claimed in claim 1, wherein
in the evaluating step the evaluation unit detects the irregular operating mode of the installation if the evaluation of the at least one first signal registers one of more of permanently acting anomaly, regularly occurring anomaly, briefly intensive anomaly, pulsating anomaly and anomalies which occur in a structured fashion and which do not occur during the normal operation of the installation.

10. The method as claimed in claim 1, wherein
during the evaluating step a time profile of one of both of an amplitude and a frequency content of the at least one first signal are taken into account.

11. The method as claimed in claim 1, wherein
the at least one sensor is one or more of an optical sensor, a radiation sensor, a sound sensor, a vibration sensor, a pressure sensor, a flow sensor and a temperature sensor.

12. An evaluation unit configured to carry out the method as claimed in claim 1, wherein
the evaluation unit includes
a signal processing module configured to process the at least one first signal,
an evaluation module configured to evaluate the at least one first signal,
a memory with technological data of the installation, and
an input/output unit,
the evaluation unit is configured to autonomously perform actuation/closed-loop control of components of the installation when the irregular operating mode of the installation is detected, and
the evaluation unit is a local open-loop and/or closed-loop control device which is arranged on or in the flow-conducting device.

* * * * *